United States Patent [19]
Luna

[11] Patent Number: 6,063,346
[45] Date of Patent: May 16, 2000

[54] PROCESS FOR SCAVENGING HYDROGEN SULFIDE AND MERCAPTAN CONTAMINANTS FROM A FLUID

[75] Inventor: German A. Luna, Punto Fijo, Venezuela

[73] Assignee: Intevep, S. A., Caracas, Venezuela

[21] Appl. No.: 09/092,379

[22] Filed: Jun. 5, 1998

[51] Int. Cl.$^7$ .................................. C01B 17/16; B01J 8/00
[52] U.S. Cl. .................... 423/220; 423/226; 423/244.01; 423/245.1; 208/208 R
[58] Field of Search .............................. 423/220, 244.01, 423/245.1, 573.1, 226, 228; 208/208 R, 236, 240

[56] References Cited

U.S. PATENT DOCUMENTS

| | | |
|---|---|---|
| 4,450,777 | 5/1984 | Wolfrum et al. . |
| 4,569,766 | 2/1986 | Kool et al. . |
| 5,128,049 | 7/1992 | Gatlin ....................................... 210/752 |
| 5,424,051 | 6/1995 | Nagji et al. . |
| 5,478,541 | 12/1995 | Samuels et al. . |
| 5,554,349 | 9/1996 | Rivers et al. ............................ 423/228 |
| 5,698,171 | 12/1997 | Trauffer et al. ......................... 423/220 |
| 5,744,024 | 4/1998 | Sullivan, III et al. .................. 208/236 |
| 5,750,083 | 5/1998 | Mimura et al. ......................... 423/228 |

OTHER PUBLICATIONS

Webster's New World Dictionary, Third College Edition, p. 520, 1988.

*Primary Examiner*—Steven P. Griffin
*Assistant Examiner*—Elin Warn
*Attorney, Agent, or Firm*—Bachman & LaPointe, P.C.

[57] ABSTRACT

A process for scavenging hydrogen sulfide and mercaptan contaminants from a fluid, including the steps of: providing a fluid containing hydrogen sulfide and mercaptan contaminants; mixing the fluid with a benign contaminant scavenger so as to provide a fluid mixture; and subjecting the fluid mixture to scavenging conditions so as to provide a fluid product containing benign contaminant transformants.

15 Claims, No Drawings

PROCESS FOR SCAVENGING HYDROGEN SULFIDE AND MERCAPTAN CONTAMINANTS FROM A FLUID

BACKGROUND OF THE INVENTION

The invention relates to a process for removal of hydrogen sulfide and mercaptan contaminants from a fluid, especially from hydrocarbons such as refinery fuel gas, LPG, cracked gasoline, straight run gasoline, natural gasoline, and heavier hydrocarbon distillates including kerosene, fuel oil and the like.

Sulfur contaminants in the form of hydrogen sulfide and mercaptan are undesirable for a large number of reasons. For example, hydrogen sulfide can be hazardous to persons exposed thereto, and mercaptan is objectionable due to a strong odor. Furthermore, these components can be objectionable due to their chemical reaction with other hydrocarbons or fuel system components.

There have been many attempts to provide processes for the removal of mercaptan contaminants. Early processes included treatment of the hydrocarbon fractions with caustic, clays, and hydrotreating. One such process is the UOP Merox process, which was announced in 1959 (Oil and Gas Journal, Oct. 26, 1959). This process used a catalyst which was soluble in caustic, or alternatively held on a support, to oxidize mercaptans to disulfides in the presence of oxygen and caustic. A main disadvantage of caustic treatment is that disposal of spent caustic is undesirable for environmental reasons.

Other chemical processes for the treatment of hydrocarbon feeds containing sulfur compounds and acidic components have involved purely chemical reactions such as scrubbing with mono or diethanolamine or counter current extraction using a hot potassium carbonate solution. Amine systems are, unfortunately, high in operation cost and further characterized by corrosive nature of the absorbing liquids used, and the inability to sufficiently remove mercaptan.

It is therefore the primary object of the present invention to provide a process for scavenging hydrogen sulfide and mercaptan contaminants from a fluid which avoids the need for caustic treatment.

It is a further object of the present invention to provide a process for scavenging sulfur contaminants from a fluid which effectively scavenges both hydrogen sulfide and mercaptan contaminants.

Other objects and advantages of the present invention will appear hereinbelow.

SUMMARY OF THE INVENTION

In accordance with the present invention, the foregoing objects and advantages are readily attained.

According to the invention, a process for scavenging hydrogen sulfide and mercaptan contaminant from a fluid such as a hydrocarbon feedstock is provided, which process comprises the steps of: providing a fluid containing hydrogen sulfide and mercaptan contaminants; mixing said fluid with a benign contaminant scavenger so as to provide a fluid mixture; and subjecting said fluid mixture to scavenging conditions so as to provide a fluid product containing benign contaminant transformants.

The contaminant scavenger of the present invention is preferably at least one compound or component selected from group consisting of triazines, maleimides, formaldehydes, amines, carboxamides, alkyl-carboxyl-azo compounds, cumine-peroxide compounds and mixtures thereof, preferably two different components, and most preferably a combination of a triazine and an alkyl-carboxyl-azo compound.

DETAILED DESCRIPTION

The invention relates to a process for scavenging hydrogen sulfide and mercaptan (thiol) contaminants from a fluid. The process of the present invention finds applicability for use in treating a large number of fluids including hydrocarbons, water, combinations of liquid and/or gaseous phases, and the like. Particularly useful fluids to be treated with the process of the present invention include hydrocarbons such as refinery fuel gas, LPG, light catalytically cracked gasoline (LCCG), straight run gasoline, natural gasoline and heavier hydrocarbon distillates including kerosene, fuel oil and the like. The fluid or feedstock in accordance with the present invention is preferably characterized by undesirable amounts of sulfur contaminant, especially hydrogen sulfide and mercaptan.

In accordance with the present invention, it has been found that such sulfur contaminants can be neutralized and/or removed from a fluid or feedstock through contact of the fluid containing the contaminants with a benign contaminant scavenger which, when contacted with the fluid, serves to substantially transform the sulfur contaminants into benign products such as disulfides and polysulfides, which are referred to herein as benign contaminant transformants, thereby completely avoiding the need for additional treatment and the like and avoiding environmentally undesirable treatment compositions such as caustic, which is not benign.

In accordance with the process of the present invention, and as used herein, a benign contaminant scavenger is a composition which serves to cause and/or assist in transformation of hydrogen sulfide and mercaptan without creating or itself being a substance in the final product stream which is undesirable. Examples of suitable scavengers include compounds selected from the group consisting of triazines, maleimides, formaldehydes, amines, carboxamides, alkyl-carboxyl-azo compounds, cumine-peroxide compounds and mixtures thereof. Particularly suitable as a contaminant scavenger in accordance with the present invention is a combined dosage of a hydrogen sulfide scavenger component and a mercaptan scavenger component in different points of application. Particularly suitable hydrogen sulfide scavenger components include each of the above, most preferably triazines. Suitable mercaptan scavenger components include maleimides, formaldehydes, amines, carboxamides, alkyl-carboxyl-azo compounds, cumine-peroxide compounds and mixtures thereof, preferably an alkyl-carboxyl-azo compound or a cumine-peroxide compound. A particularly effective contaminant scavenger according to the invention is a combination of triazine and alkyl-carboxyl-azo compound.

As set forth above, the fluid to be treated in accordance with the present invention may be selected from a wide group of materials, the removal of sulfur contaminants from which is desirable, but it is particularly advantageous to use the process of the present invention to treat hydrocarbons. The fluid or feed may typically contain contaminant including hydrogen sulfide in an amount of between about 5 ppm (wt) and about 200 ppm (wt), and may contain mercaptan contaminant in an amount between about 15 ppm (wt) and about 500 ppm (wt).

Both the hydrogen sulfide scavenger component and the mercaptan scavenger component in accordance with the process of the present invention are preferably contacted with the fluid or feed to be treated, and mixed so as to insure substantially homogeneous dispersion of each scavenger component through the fluid. In this regard, the contact of fluid with scavenger may be carried out by mixing the scavenger with the fluid, and passing the resulting mixture through any suitable mixing apparatus such as, for example, static mixers, dynamic mixers, pumps, heat exchangers, pipelines, quill injectors, spray nozzle injectors, and combinations thereof.

Contaminant scavenger in accordance with the present invention is preferably mixed with the feed in a ratio by weight of total scavenger to contaminant in the feed of between about 1:1 and about 10:1, more preferably between about 1:1 and about 3:1. Further, in accordance with the preferred embodiment of the present invention wherein the scavenger includes a hydrogen sulfide scavenger component such as triazine and a mercaptan scavenger component such as an alkyl-carboxyl-azo compound, the scavenger is preferably mixed with fluid or feedstock so as to provide a ratio of triazine to hydrogen sulfide of between about 1:1 and about 6:1, more preferably between about 2:1 and about 5:1, and to provide a ratio of alkyl-carboxyl-azo compound to mercaptan by weight of between about 1:1 and about 2.5:1.

It has been found that by contacting the scavenger of the present invention with the fluid or feedstock to be treated, the contaminant as well as the scavenger components react or interact so as to provide final products which are benign or acceptable from environmental, safety and process standpoints. The hydrogen sulfide and mercaptan contaminants are converted to disulfides and/or polysulfides in the final products of the process which are not hazardous or harmful to process equipment and which can be more easily disposed of.

As set forth above, it is preferable that the scavenger of the present invention be provided having a hydrogen sulfide scavenging component and a mercaptan scavenging component, and that the feed be treated sequentially with these components, most preferably sequentially first with the hydrogen sulfide scavenging component and second with the mercaptan scavenging component. This is due to the fact that it has been found, in accordance with the present invention, that a smaller amount of each component of the scavenger can be utilized to provide excellent results in scavenging both hydrogen sulfide and mercaptan, as will be set forth below. This advantageously provides for excellent reduction in levels of contaminant, while also advantageously reducing the amount of scavenger needed to treat a particular batch or stream of fluid or feedstock.

Although excellent results can be obtained using the contaminant scavenger of the present invention at a wide variety of conditions, it has been found that best results are obtained when scavenging is carried out at a temperature between about 25° C. and about 180° C., more preferably between about 40° C. and about 130° C. and most preferably between about 100° C. and about 130° C.

It has also been determined in accordance with the present invention that when the scavenger component of the present invention is to include both a hydrogen sulfide scavenging component and a mercaptan scavenging component, that the contacting step may suitably be carried out by mixing one component of the hydrogen sulfide scavenging and mercaptan scavenging components with the fluid and passing the mixture through a first mixer to provide a partially treated fluid, and subsequently mixing the partially treated fluid with the other component of the hydrogen sulfide scavenging and mercaptan scavenging components and passing this mixture through either the same or a different mixer so as to provide the finally treated fluid having scavenged levels of hydrogen sulfide and mercaptan. Most preferably, the fluid is treated first with hydrogen sulfide scavenger component and then with mercaptan scavenger component.

Particularly suitable types of feed or fluid to be treated in accordance with the present invention include feeds containing mercaptan contaminants in the form of RSH, wherein R is a hydrocarbon radical having between about 1 and about 10 carbon atoms, S is sulfur and H is hydrogen. Of course, other types of mercaptans are scavenged in accordance with the process of the present invention as well.

It has also been found that particularly desirable results can be obtained using the process of the present invention to treat a light catalytic cracking gasoline (LCCG) feed containing between about 5 and about 200 ppm hydrogen sulfide and containing between about 15 and about 500 ppm mercaptan, most preferably by treating the LCCG feed first with a hydrogen sulfide scavenging component and then with a mercaptan scavenging component in accordance with the present invention, so as to substantially transform the hydrogen sulfide contaminant into a benign polysulfide product, and to transform the mercaptan contaminant into a benign disulfide product so as to provide a substantially hydrogen sulfide and mercaptan free gasoline.

The following examples illustrate the beneficial results obtained in accordance with the process of the present invention.

EXAMPLE 1

This example demonstrates the scavenger ability of a benign hydrogen sulfide scavenger. The fluid used was a LCCG having an $H_2S$ content of 30 ppm (wt) and a RSH content of 65 ppm (wt). The LCCG was treated using triazine as a hydrogen sulfide scavenger at a ratio by weight of triazine to hydrogen sulfide of 5:1, 4:1, 2:1, 1:1, at ambient temperature with no additional mixing. Table 1 below sets forth the results achieved in terms of % $H_2S$ removal at each ratio.

TABLE 1

| Ratio | % $H_2S$ removal |
|---|---|
| 1:1 | 8% |
| 2:1 | 29% |
| 4:1 | 76% |
| 5:1 | 100% |

As shown significant $H_2S$ removal is achieved at 5:1 ratio.

EXAMPLE 2

This example further demonstrates the scavenger ability of a hydrogen sulfide scavenger treating the same LCCG feed as treated in Example 1, but at different temperatures, and still at the ratios of 5:1, 4:1, 2:1, 1:1. The results obtained for various temperatures at these ratios are set forth below in Tables 2–5.

TABLE 2

Ratio 1:1

| Temperature | % H$_2$S removal |
|---|---|
| 27° C. | 8% |
| 38° C. | 9.5% |
| 120° C. | 33% |

TABLE 3

Ratio 2:1

| Temperature | % H$_2$S removal |
|---|---|
| 27° C. | 29% |
| 38° C. | 37% |
| 120° C. | 49% |

TABLE 4

Ratio 4:1

| Temperature | % H$_2$S removal |
|---|---|
| 27° C. | 76% |
| 38° C. | 78% |
| 120° C. | 94% |

TABLE 5

Ratio 5:1

| Temperature | % H$_2$S removal |
|---|---|
| 27° C. | 100% |
| 38° C. | 100% |
| 120° C. | 100% |

As shown above, carrying out the contacting step at increased temperature provided better results using a lower ratio of H$_2$S scavenger to hydrogen sulfide.

EXAMPLE 3

This example demonstrates the scavenger ability of a benign mercaptan scavenger. The fluid used was a LCCG having a H$_2$S content of 30 ppm (wt) and a RSH content of 65 ppm (wt). The LCCG was treated using alkyl-carboxyl-azo compound, specifically using bis-(isopropylacetate)-azo, as a mercaptan scavenger at a ratio by weight of scavenger to mercaptan of 10:1, 5:1, 2.5:1, 1.25:1, at ambient temperature with no additional mixing. Table 6 below sets forth the results achieved in terms of % RSH removal at each ratio.

TABLE 6

| Ratio | % RSH removal |
|---|---|
| 1.25:1 | 58.4% |
| 2.5:1 | 64.4% |
| 5:1 | 69.8% |
| 10:1 | 71.4% |

As shown, alkyl-carboxyl-azo compound provides reduction in RSH levels with gradual increase in removal at higher ratios.

EXAMPLE 4

This example further demonstrates the scavenger ability of the same benign mercaptan scavenger to treat the same LCCG feed as treated in Example 3, but at different temperatures, and still at the ratios of 10:1, 5:1, 2.5:1 and 1.25:1. The results obtained for various temperatures at these ratios are set forth below in Tables 7–10.

TABLE 7

Ratio 1.25:1

| Temperature | % RSH removal |
|---|---|
| 27° C. | 58.4% |
| 38° C. | 64.9% |
| 50° C. | 65.6% |

TABLE 8

Ratio 2.5:1

| Temperature | % RSH removal |
|---|---|
| 27° C. | 64.4% |
| 38° C. | 68.5% |
| 50° C. | 70.4% |

TABLE 9

Ratio 5:1

| Temperature | % RSH removal |
|---|---|
| 27° C. | 69.8% |
| 38° C. | N/A |
| 50° C. | 74.6% |

TABLE 10

Ratio 10:1

| Temperature | % RSH removal |
|---|---|
| 27° C. | 71.4% |
| 38° C. | 75.3% |
| 50° C. | 78.9% |

As shown above, carrying out the contacting step at increased temperature provided better results using a lower ratio of mercaptan scavenger to mercaptan.

EXAMPLE 5

To further illustrate the advantageous use of a scavenger containing both hydrogen sulfide and mercaptan scavenger components, the same LCCG feed was treated, at ambient conditions using: only H$_2$S scavenger (triazine), then only mercaptan scavenger (bis-(isopropylacetate)-azo compound), and then both scavengers sequentially using H$_2$S scavenger first followed by mercaptan scavenger. Tables 11–12 below set forth the results obtained.

TABLE 11

| Ratio | % H$_2$S Removal | % RSH Removal |
|---|---|---|
| 2:1 H$_2$S | 29.0% | 0% |
| 2.5:1 RSH | 75.5% | 64.4% |
| 2:1 H$_2$S + 2.5:1 RSH | 85.0% | 64.4% |

TABLE 12

| Ratio | % H$_2$S Removal | % RSH Removal |
|---|---|---|
| 5:1 H$_2$S | 100.0% | 0% |
| 2.5:1 RSH | 75.5% | 64.4% |
| 5:1 H$_2$S + 2.5:1 RSH | 100.0% | 92.3% |

As shown, at each of the combinations of ratios provided, better results were obtained using a sequential application of hydrogen sulfide scavenger followed by mercaptan scavenger, which provides excellent removal of both H$_2$S and mercaptan (RSH).

EXAMPLE 6

This example illustrates the advantageous use of a scavenger containing both hydrogen sulfide (triazine) and mercaptan scavenger components (bis-(isopropylacetate)-azo compound). The same LCCG from Example 5 was treated, at different temperatures, using: only H$_2$S scavenger, then only mercaptan scavenger, and then both scavengers sequentially. Tables 13–14 below set forth the results obtained.

TABLE 13

Temperature 38° C.

| Ratio | % H$_2$S Removal | % RSH Removal |
|---|---|---|
| 2:1 H$_2$S | 37.0% | 0% |
| 2.5:1 RSH | 85.8% | 68.5% |
| 2:1 H$_2$S + 2.5:1 RSH | 100.0% | 76.0% |

TABLE 14

Temperature 50° C.

| Ratio | % H$_2$S Removal | % RSH Removal |
|---|---|---|
| 5:1 H$_2$S | 100.0% | 0% |
| 2.5:1 RSH | 100.0% | 70.4% |
| 5:1 H$_2$S + 2.5:1 RSH | 100.0% | 83.0% |

As in Example 5, the example also shows that the sequential treatment in accordance with the process of the present invention using first hydrogen sulfide scavenger followed by mercaptan scavenger provides for excellent results as compared to the use of each scavenger individually, and reduced ratios of each scavenger can be used to provide for excellent results, particularly at high temperatures.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for scavenging hydrogen sulfide and mercaptan contaminants from a fluid, comprising the steps of:

providing a fluid containing hydrogen sulfide and mercaptan contaminants;

mixing said fluid with a benign contaminant scavenger comprising a hydrogen sulfide scavenger component and a mercaptan scavenger component wherein said hydrogen sulfide scavenger component and said mercaptan scavenger component are different from each other and are selected from the group consisting of triazines, maleimides, formaldehydes, amines, carboxamides, alkylcarboxyl-azo compounds, and cumine-peroxide compounds so as to provide a fluid mixture; and subjecting said fluid mixture to scavenging temperature conditions so as to provide a fluid product containing benign contaminant transformants wherein said product is substantially free of said hydrogen sulfide and mercaptan contaminants.

2. A process according to claim 1 wherein said mixing and subjecting steps are carried out sequentially first with one of said hydrogen sulfide scavenger component and said mercaptan scavenger component so as to provide a partially treated fluid, and then with the other of said hydrogen sulfide scavenger component and said mercaptan scavenger component so as to provide said fluid product.

3. A process according to claim 2, wherein said one component is said hydrogen sulfide scavenger component and wherein said other component is said mercaptan scavenger component.

4. A process according to claim 2, wherein said hydrogen sulfide scavenger component comprises a compound selected from the group consisting of triazines, maleimides, formaldehydes, amines, carboxamides, alkyl-carboxyl-azo compounds, cumine-peroxide compounds and mixtures thereof, and wherein said mercaptan scavenger component comprises a compound different from said hydrogen sulfide scavenger component and selected from the group consisting of maleimides, formaldehydes, amines, carboxamides, alkyl-carboxyl-azo compounds, cumine-peroxide compounds and mixtures thereof.

5. A process according to claim 2, wherein said hydrogen sulfide scavenger component is present at a ratio by weight of scavenger to hydrogen sulfide contaminant of between about 1:1 and about 6:1, and wherein said mercaptan scavenger component is present at a ratio by weight of scavenger to mercaptan of between about 1:1 and about 2.5:1.

6. A process according to claim 1, wherein the subjecting step is carried out at a temperature between about 20° C. and about 180° C.

7. A process according to claim 1, wherein the subjecting step is carried out at a temperature between about 40° C. and about 130° C.

8. A process according to claim 1, wherein the subjecting step is carried out at a temperature between about 100° C. and about 130° C.

9. A process according to claim 1, wherein the fluid comprises a hydrocarbon.

10. A process according to claim 1, wherein the fluid is water.

11. A process according to claim 1, wherein the fluid is selected from the group consisting of liquids, gases, and mixtures thereof.

12. A process according to claim 1, wherein the fluid is selected from the group consisting of gasoline, LCG, LCCG or mixtures thereof, and wherein the fluid product comprises a substantially hydrogen sulfide and mercaptan free gasoline.

13. A process according to claim 1, wherein the fluid contains mercaptan in the form RSH wherein R is a hydrocarbon radical having between about 1 and about 10 carbon atoms, S is sulfur and H is hydrogen.

14. A process according to claim 1, wherein the fluid contains hydrogen sulfide in an amount between about 5 ppm and about 200 ppm, and mercaptan in an amount between about 15 ppm and about 500 ppm.

15. A process according to claim 1, wherein said benign contaminant transformants are selected from the group consisting of disulfides, polysulfides and mixtures thereof.

* * * * *